United States Patent

[11] 3,563,286

[72] Inventors Keene S. Strobel,
  Everett; Peter E. Heiser,
  Issaquah, Wash.
[21] Appl. No. 19,531
[22] Filed Mar. 18, 1970
[45] Patented Feb. 16, 1971
[73] Assignee Weyerhaeuser Company
  Tacoma, Wash.
  Continuation of application Ser. No.
  702,858, Feb. 5, 1968, now abandoned,
  which is a continuation-in-part of
  application Ser. No. 696,202, Jan. 8, 1969,
  now abandoned.

[54] SAW
  8 Claims, 3 Drawing Figs.
[52] U.S. Cl. ................................................. 143/140
[51] Int. Cl. .............................................. B27b 33/08
[50] Field of Search .................................... 143/140,
  133, 137; 144/238, 239, 29 (Inquired)

[56] References Cited
UNITED STATES PATENTS
552,573 1/1896 Baar ........................... 144/239

| 2,609,017 | 9/1952 | Chapin | 143/137 |
| 2,657,720 | 11/1953 | Wolfe | 143/140 |
| 2,667,904 | 2/1954 | Gommel | 143/137 |
| 2,720,229 | 10/1955 | Drake | 143/140 |
| 2,995,163 | 8/1961 | Roberts | 144/239 |

FOREIGN PATENTS
214,631 7/1924 Great Britain ................ 143/140

Primary Examiner—Donald R. Schran
Attorneys—Leslie G. Noller, John M. Crawford and Kenneth W. Vernon ABSTRACT: A saw having a plurality of spaced teeth around the periphery of a saw disc and a plurality of slots cut inwardly of the periphery of the saw disc, the slots preferably being faced on the cutting side with a facing inlay extending substantially the length thereof, the facing inlay having a width substantially the same, or slightly less than the width of the kerf of the cutting teeth. The cutting edge of the slots is in a negative hook position with respect to saw motion and to a radial line extending from the center of the saw blade to the periphery thereof.

PATENTED FEB 16 1971
3,563,286
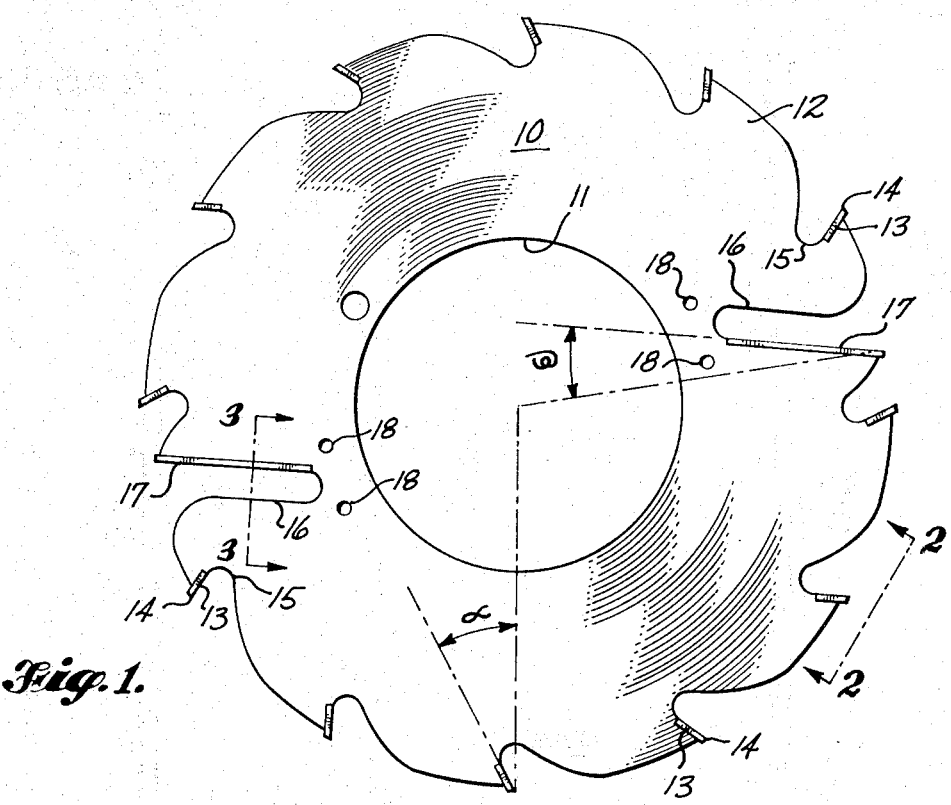
Fig. 1.
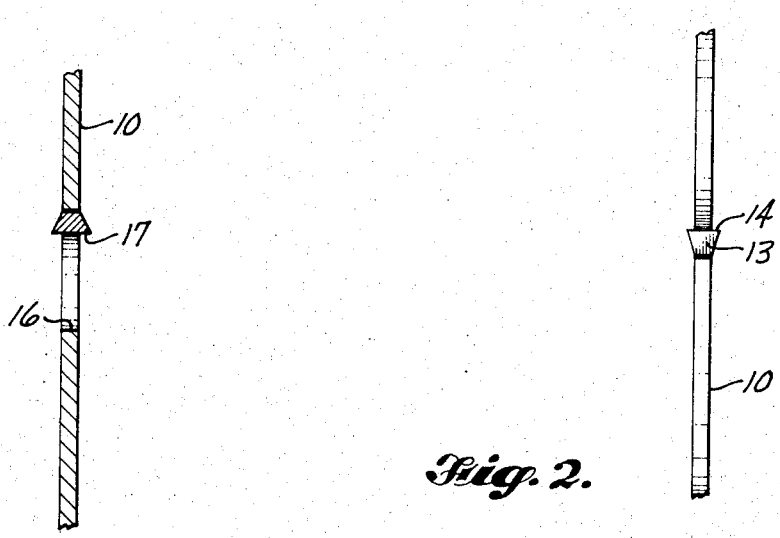
Fig. 3.
Fig. 2.
INVENTORS
KEENE S. STROBEL
PETER E. HEISER
BY Leslie C. Noller &
Kenneth H. Vernon
ATTORNEYS

SAW

CROSS REFERENCE TO RELATED APPLICATION

This is a continuation of application Ser. No. 702,858, filed Feb. 5, 1968, which is a continuation-in-part of application Ser. No. 696,202 filed Jan. 8, 1969, both now abandoned.

BACKGROUND OF THE INVENTION

1. Field of the Invention

This invention relates to a circular saw blade for longitudinally sawing wood, the saw blade having a plurality of apertures or slots cut therein.

2. Description of the Prior Art

One method of cutting semirough cants or flat material into lumber involves the use of an edger using circular saws in fixed multiple positions mounted on an arbor or on collars. There are both single and double arbor saws. In the double arbor saw one set of saws is mounted directly over but slightly ahead or back of the other set of saws. A great amount of difficulty has been encountered in breakage of saw blades used in both the single and double arbor edgers, resulting in a tremendous amount of down time and expense of replacement of the saw blades. Conventional edger saws usually become damaged, burned, and eventually break, usually around the eye or center portion of the saw.

Although many saws have what might be called "sawdust slots," none are known wherein long slots are inlaid with a facing that makes the face of the slot wider than the thickness of the saw blade. U.S. Pat. No. 3,344,823 describes an edger saw having a number of internal apertures lined up with one another in a spiral sequence, the apertures faced with tungsten carbide or other suitable metal. Saws of this configuration are very difficult to sharpen and maintain and have not been as successful in day-to-day operation as the saw of the present invention. Another saw configuration is described in U.S. Pat. No. 3,344,822, wherein radial linear planing elements, constructed of tungsten carbide or other hard metal, are secured to the surface of the saw blade. Certain disadvantages are associated with the saw of this type configuration not present with the saw blade of the instant invention.

The saw of this invention constitutes a significant advance for use in edgers and other gang or ripping applications in that it has a significantly longer life, is "self-cleaning," can be run for long periods of time without replacement or breakage, and stay in a predetermined positive position to cut accurately.

SUMMARY OF THE INVENTION

A saw having a plurality of circumferentially spaced teeth and a plurality of slots extending inwardly from the periphery of the saw, the slots preferably being faced on the cutting edge with an inlay material having a width substantially that of the width of the kerf of the saw teeth. The cutting edge of the slots is positioned in a negative hook position with respect to saw motion and to a radial line extending from the center of the saw blade to the cutting edge thereof. Preferably, the slots extend inwardly to or very near the collar line of the saw.

BRIEF DESCRIPTION OF THE DRAWINGS

FIG. 1 is a face elevation of the saw embodying the present invention.

FIG. 2 is an enlarged fragmentary cross section of the saw blade of this invention showing the saw teeth and cutting elements as viewed from line 2-2 of FIG. 1.

FIG. 3 is an enlarged fragmentary cross section of the slot of the saw blade of this invention as viewed from line 3-3 of FIG. 1.

DETAILED DESCRIPTION OF THE DRAWINGS

In FIG. 1, the rotary saw of this invention includes a disclike saw blade or plate 10 having a central opening 11 and a plurality of saw teeth 12 circumferentially positioned around the periphery of the plate 10. Each tooth 12 has a leading edge relative to the direction of rotation of the blade, with each of the edges faced with a suitable insert 13 having a cutting edge 14. The inserts may be of any suitable hard metal such as tungsten carbide, cobalt-steel alloy, or alloys sold under the trade names Stellite or Studite. The inserts are fixed to the leading edge 13 by welding or brazing. These inserts have a width greater than that of the saw disc. Each of the saw teeth 12 is provided with a rounded gullet 15. The face angle $\alpha$ of the cutting edge 14 with respect to a radial line extending from the center of the blade to the cutting edge 14 may be that of any of conventional saw blades, and preferably ranges from about 10° to 45°.

Between the regular spacing of two of the teeth the saw plate 10 is slotted from the periphery inwardly. The slots are cut directly opposite each other so as to balance the saw plate. The cutting edge of the slots 16 is preferably cut at a negative angle $\beta$ with respect to saw motion and to a radial line extending from the center of the saw blade to the cutting edge or periphery thereof and extends nearly to the periphery of the spacers or collars which hold the saws in position, should collars be used in mounting the saws. The slots are preferably faced on the cutting side with hard facing elements 17 of tungsten carbide, cobalt-steel alloy, Stellite, Studite or other suitable hard material. This facing element is welded or brazed to the saw plate. The angle $\beta$ may range from a −1° to a −40°, but preferably ranges from a −10° to a −20°. The width of the facing element 17 is substantially the same or slightly less than the extreme width or kerf of the saw teeth 12. As shown, the facing elements extend substantially the entire length of the slots 17 and a short distance beyond the edge of the saw plate. Although this extension is not necessary to the efficient operation of the saw it provides certain advantages.

On each side of the slots at the base thereof small holes 18 may be drilled or punched to relieve stress in the saw plate.

Although the saw plate of FIG. 1 is shown as only having two slots, more can be provided if desired.

The faced slots placed in the negative hook position as shown in FIG. 1 give the edger saw blade of this invention two features which eliminate burning and breakage. In a conventional saw, each of the inserts or facing elements on each of the teeth extend down the face of the tooth only about ½', although longer facings have been tried. As this insert cuts the lumber, the residue or sawdust gathers in the throat or gullet immediately ahead of the tooth. Since the gullet is the same width as the saw disc and the hard facing inserts are somewhat wider, the sawdust spills over the side of the gullets on both sides of the saw disc and lodges between the face of the material being cut and the side of the saw. It is believed that this sawdust is never allowed to completely leave its position from the side of the blade because of the tremendous speed of the saw, which may range up to 15,000 f.p.m. Much of the sawdust that is on the face of each of the teeth or in the gullets thereof travels around and around the saw as it cuts the lumber. This residual sawdust crowds the position of the saw in the cut and causes heat which considerably distorts the saw causing it to poorly cut lumber, bend, and eventually break. The faced slots of the saw blade of this invention having facing elements or inlays substantially equal to the extreme kerf or width of the saw teeth which pick up substantially all of the sawdust that has drifted by the throat or gullet of each of the saw teeth and hold this material in position ahead of the inlays on the slots. Because the face of the slots are in a negative position the sawdust is immediately ejected by centrifugal force from the cutting area as soon as each of the slots leaves the cut. Referring specifically to FIG. 1, each faced slot removes all the sawdust that has drifted by the six teeth in each half revolution of the saw allowing the other half of the saw to enter the cut free of any surplus debris or sawdust. This reduces, if not eliminates, any heat that might be generated and also reduces crowding of the saw because of lingering sawdust.

Referring again specifically to FIG. 1, it is seen that the saw is divided into two portions from the periphery of the saw to the periphery of the spacers or collars that hold the saws in position. The saw as it enters a cutting area is actually two half blades. If, for any reason, the saw should bend or be distorted, it is followed immediately by another half portion of the saw which has no connection to the half that has immediately left the cut. This second half comes into the cut area stiff and straight. If there is some deviation in the cut, the second or following half of the saw, which is stiff and straight, will cut its way free and straight. Also, because of the negative hook of the faced slots, the following half saw first enters the cut at a position nearer the collar line (the most stable portion of the saw) as compared to the tooth points on the extreme edge of the saw, so that the negative hook slot tends to shear or slice its way through the wood rather than punching its way through the wood on the lead side of the cut.

An additional advantage of the saw blade of the instant invention is in its simple maintenance. The faced slots are very simple to sharpen because the hard facing inserts can be easily sharpened with a suitable standard grinding wheel and with standard equipment. In addition, welding or brazing of the facing inlays on the slots is easy because the slots extend completely out to the periphery of the saw plate; thus, any heat that is generated by welding does not distort the blade.

Saws having slots of the configuration shown in FIG. 1 can be made to cut almost any thickness desired, depending entirely on the diameter of the saw or saws. Although their most useful application is in single and double arbor edgers wherein multiple numbers of these saws are held in fixed position the saws of this invention are applicable in any gang or ripping application where saws tend to bind during cutting operations. The thickness of the saw plates affects the thickness of the kerf of the saw. Because the saws of this invention can be operated successfully with almost little or no breakage, the kerf can be reduced a significant amount from that necessary with conventional saw blades.

While this invention has been described with reference to the drawings, it should be understood that this invention is not limited by that actually shown or described but includes all the equivalents thereof.

We claim:

1. A circular rip saw comprising:
    a circular saw plate having a plurality of teeth spaced around the periphery thereof:
    a central opening in the saw plate for a mounting means passing through the saw;
    at least two slots in the saw plate disposed between the teeth and extending inwardly from the periphery of the saw plate toward the central opening dividing the saw plate into sectors of substantially equal size acting as independent saws so that each sector enters the cut in a workpiece being sawn along a predetermined line of cut regardless of lateral deflection induced in the preceeding sector as it passes through the cut; and
    respective cutting elements mounted on the leading edges of the teeth and the trailing edges of the slots, each projecting laterally in both directions beyond the side faces of the saw plate, the cutting elements for the slots extending substantially the full length of the trailing edges and aiding to restore an off-line cut of the preceeding sector to its predetermined line of cut and to clear sawdust from the cut.

2. The saw of claim 1 wherein the teeth are regularly spaced around the periphery of the saw plate and separated by gullets and the slots are positioned between the regularly spaced teeth.

3. The saw of claim 1 wherein the trailing edges of each of the slots is positioned at a negative angle with respect to saw motion and to a radial line extending from the center of the saw plate to the periphery thereof so that the lower edges of the cutting elements on the trailing edges of the slots first enters the cut made by the preceeding sector of the saw.

4. A circular saw comprising:
    a saw plate having a plurality of regularly spaced teeth around the periphery thereof;
    a central opening in the saw plate adapted to receive a mounting means, a clamping zone around the opening defining an area on the side surfaces of the saw plate adapted to be contacted by clamping means holding the saw plate in fixed position;
    at least two slots in the saw plate disposed between the teeth and extending inwardly from the periphery of the plate to substantially the clamping zone; and
    respective cutting elements mounted on the leading edges of the teeth and the trailing edges of the slots, each projecting laterally in both lateral directions beyond the side faces of the plate, the cutting elements for the slots extending substantially the full length of the trailing edges and slightly less in width than the cutting elements mounted on the teeth.

5. A circular rip saw comprising:
    a circular saw plate having a plurality of hooked teeth spaced by gullets and faced in a given direction of rotation around the periphery of the saw plate, a central opening in the saw plate adapted to receive a mounting means passing through the saw plate;
    a ring-shaped clamping zone adjacent to and around the opening spaced inwardly from the gullets a radial distance considerably greater than the radial depth the gullets;
    at least two slots through the saw plate, each open at its outer end and extending between teeth on the periphery of the saw plate inwardly substantially to the clamping zone, the slots thereby dividing the portion of the saw plate outwardly of the clamping zone into congruent saw sectors acting as substantially independent saw units whereby each of the sectors is free to deflect independently of the other; and
    respective cutting elements mounted on the leading edges of the teeth and the trailing edges of the slots with each projecting laterally in both lateral directions beyond the side faces of the saw plate, the cutting elements for the slots extending substantially the full length thereof.

6. The saw of claim 5 wherein the trailing edges of each of the slots is positioned at a negative angle with respect to saw motion and to a radial line extending from the center of the saw blade to the periphery thereof so that the lower edges of the cutting elements on the trailing edges of the slots first enter the cut made by the preceeding sector of the saw.

7. The saw of claim 5 wherein the lateral width of the cutting elements on the trailing edges of the slots is slightly less in width than the lateral width of the cutting elements mounted on the teeth.

8. A circular rip saw comprising at least two congruent saw sectors separated from each other by slots and having a plurality of regularly spaced teeth around the periphery thereof adapted to be mounted around a central arbor and held in fixed position by clamping means contacting the sides of the saw sectors and around the arbor, the sectors acting as substantially independent saw units whereby each of the sectors is free to deflect independently of the other;
    cutting element mounted on the leading edges of the teeth; and
    cutting elements mounted on the leading terminating edges of each of the sectors with respect to motion of the saw and extending substantially the full length of the leading edges, the respective cutting elements projecting laterally in both lateral directions beyond the side faces of the sectors.

UNITED STATES PATENT OFFICE
CERTIFICATE OF CORRECTION

Patent No. 3,563,286                    Dated February 16, 1971

Inventor(s) Keene S. Strobel, Peter E. Heiser

It is certified that error appears in the above-identified patent and that said Letters Patent are hereby corrected as shown below:

On the front page of the patent document under "[73] Assignee", that portion reading "which is a continuation-in-part of application Ser. No. 696,202, Jan. 8, 1969, now abandoned." should read -- which is a continuation-in-part of application Ser. No. 696,202, Jan. 8, 1968. --

In column 1, line 7, that portion reading "filed Jan. 8, 1969," should read -- filed Jan. 8, 1968,--.

In column 4, line 62, that portion reading "cutting element" should read -- cutting elements --.

Signed and sealed this 10th day of August 1971.

(SEAL)
Attest:

EDWARD M. FLETCHER, JR.          WILLIAM E. SCHUYLER, JR.
Attesting Officer                Commissioner of Patents